United States Patent [19]
Duke et al.

[11] 3,720,526
[45] March 13, 1973

[54] GLASS-CERAMIC BODY

[75] Inventors: David A. Duke, Corning; John F. MacDowell, Painted Post, both of N.Y.

[73] Assignee: Corning Glass Works, Corning, N.Y.

[22] Filed: Aug. 12, 1971

[21] Appl. No.: 171,343

Related U.S. Application Data

[63] Continuation-in-part of Ser. No. 452,388, April 30, 1965, abandoned.

[52] U.S. Cl. .................. 106/39.6, 106/52, 65/33
[51] Int. Cl. .............................................. C03c 3/22
[58] Field of Search ...................... 106/39 DV; 65/33

[56] References Cited

UNITED STATES PATENTS

| | | | |
|---|---|---|---|
| 3,236,662 | 2/1966 | MacDowell | 106/52 X |
| 3,528,828 | 9/1970 | Smith | 106/39 DV |
| 3,201,266 | 8/1965 | MacDowell | 106/39 DV |
| 3,146,114 | 8/1964 | Kivlighn | 106/39 DV |
| 3,282,770 | 11/1966 | Stookey et al. | 106/39 DV |

OTHER PUBLICATIONS

Urnes Advances in Glass Technology, pub. 1962 NYC by Plenum Press, pp. 377–381 "Crystallization Studies of $Na_2O-Al_2O_3-SiO_2$ Base Glasses"
Levin et al. Phase Diagrams for Ceramists pub 1964 J. Amer Cer Soc. FIG. 501 System $Na_2O-Al_2O_3-SiO_2$

*Primary Examiner*—Helen M. McCarthy
*Attorney*—Clarence R. Patty, Jr. et al.

[57] ABSTRACT

This invention relates to the manufacture of dense, fine-grained glass-ceramic articles having compositions within the $Na_2O$ and/or $K_2O-Al_2O_3-SiO_2$ field which are nucleated with $TiO_2$ and/or $ZrO_2$ and/or $SnO_2$ and wherein the principal crystal phase is a nepheline-type crystal, i.e., a nepheline and/or kaliophilite solid solution.

2 Claims, No Drawings

GLASS-CERAMIC BODY

This application is a continuation-in-part application of Ser. No. 452,388, filed Apr. 30, 1965, now abandoned.

Technology in the field of glass-ceramics or semicrystalline ceramic bodies, as they are variously termed, has been remarkably rapid and intensive research has been carried out to apply the underlying principle of production to many glass compositions. The basic concept involves the heat treatment of a glass body in such a manner as to cause the body to crystallize in situ. In brief, the manufacture of a glass-ceramic body generally comprises three major steps: (1) a glass-forming batch is melted; (2) the melt is simultaneously cooled rapidly to a glass and a shape of the desired configuration formed therefrom; and (3) the glass shape is then subjected to a determined heat treating schedule to develop crystallization within the shape itself. In many instances, a nucleating agent is included in the glass batch, this agent forming nuclei during the heat treating step upon which the desired crystals are grown. U.S. Pat. No. 2,920,971 provides a detailed description of the mechanism involved in the production of glass-ceramic bodies along with a discussion of the theoretical considerations which are inherent therein.

A glass-ceramic body is composed structurally of a multiplicity of fine-grained inorganic crystals generally homogeneously dispersed in a glassy matrix, this matrix being comprised of the residual glass left after the growth of the crystals through heat treatment. The crystals generally form a major part of the body, i.e., they constitute more than about 50 percent by weight of the body and, generally, more than about 75 percent by weight of the body. Glass-ceramic bodies usually display mechanical strengths greatly exceeding those of the original glass from which they are made. This increased strength is the result of the interlocking of the crystals, this effect being much more pronounced where the crystals are generally uniform in size and very fine-grained, i.e., about 0.05–1 micron in diameter.

Because the crystalline phase comprises a substantial proportion of a glass-ceramic body, the physical properties of the crystal directly influence the character of the final product. Thus, the thermal expansion, the electrical properties, the chemical properties, the refractoriness, the density, the optical properties, and the outward appearance of the body are affected by the crystalline phase developed in situ. In the fields of dinnerware and culinary ware, glass-ceramics have added a new dimension. Hence, glass-ceramic products are available commercially which simulate fine china in appearance but are much stronger mechanically and are much more resistant to thermal shock. Likewise, glass-ceramic cooking vessels have won wide consumer acceptance because of their attractive appearance, good resistance to thermal shock, and good resistance to mechanical breakage. However, it will be appreciated that research is continuous to find better materials for these applications.

The fine brilliant surface on an article of dinnerware is the result of the application of a glaze to the surface thereof. Such a glaze may also serve a second purpose. Thus, a glaze may be selected which has a lower linear coefficient of thermal expansion than the underlying body. After this glaze is applied and the body cooled, the glaze forms a thin compressive layer on the surface which greatly increases the flexural strength of the body, the effect on strength being relative to the difference in thermal expansion between the glaze and the overlain body. Unfortunately, glazes which have low coefficients of thermal expansion are fused at such high temperatures that glass-ceramic bodies having very low expansion coefficients, thereby exhibiting very excellent resistance to thermal shock, cannot be glazed therewith as they would deform during the glazing operation. In view of this feature, glass-ceramic bodies suitable for dinnerware must comprise a compromise in physical properties. Thus, the body has a low enough coefficient of thermal expansion which will insure satisfactory resistance to thermal shock and also has a sufficiently high deformation temperature to permit the use of a hard glaze, i.e., a glaze having a lower coefficient of thermal expansion to increase the overall strength of the body. In U.S. Pat. No. 3,201,266, John F. MacDowell, one of the co-inventors herein, described a group of glass-ceramics in the system $Na_2O \cdot BaO \cdot Al_2O_3 \cdot SiO_2 \cdot TiO_2$ which are very useful as articles of dinnerware. The bodies described therein have the outward appearance of fine china, are about two to three times stronger than the glass from which they are made, can be glazed to give mechanical strengths as high as 40,000 psi in some instances, and have satisfactory thermal shock resistance for the use intended, a linear coefficient of thermal expansion at 25°–300° C. of about 75–110 × $10^{-7}$/° C. The crystalline phases developed therein during heat treatment are nepheline and hexacelsian or celsian (dimorphs of $BaO \cdot Al_2O_3 \cdot 2SiO_2$). Although such products have enjoyed considerable commercial success, much laboratory effort has been put forward to secure a product of still higher strength while retaining and improving the other properties which make these bodies suitable for dinnerware use.

We have discovered that a very limited range of glass compositions within the system $K_2O \cdot Na_2O \cdot Al_2O_3 \cdot SiO_2$ and nucleated with at least one member of the group consisting of $TiO_2$, $ZrO_2$, and $SnO_2$ can be converted by a critically precise heat treatment into glass-ceramic bodies having crystals consisting predominantly of nepheline and/or kaliophilite solid solution which are very fine-grained, about 0.05–5 microns in diameter with the vast majority being less than 1 micron in diameter, which exhibit good strength per se, and many of which can be glazed to yield strengths in excess of 50,000 psi. The glass compositions and heat treatment are chosen to produce semicrystalline ceramic bodies wherein the crystals are very uniform in size, preferably less than 1 micron in diameter, and the bodies, themselves, resist deformation up to about 1,200° C. These factors result in an innately strong body which can be glazed with a high temperature (and low expansion) glaze thereby yielding a very strong dinnerware article. These bodies are also unusual in that though they have a high deformation temperature, the glass batches are melted at relatively low temperatures, and the heat treatment of the glass bodies is also carried out at relatively low temperatures, both of these features being extremely advantageous from the commercial point of view.

A still further desirable characteristic possessed by the glass-ceramics of this invention is the ability to be strengthened through ion exchange, as described in U.S. Pat. No. 3,573,072 of David A. Duke and Bruce R. Karstetter, to values in excess of 100,000 psi. This tremendous strengthening is a result of the fact that the bodies are highly crystalline, this crystallization being substantially all of a nepheline-type wherein the requisite ratio of potassium to sodium ions exists.

A final practicably desirable characteristic possessed by a narrow range of compositions within the broad outlines of this invention is the property of transparency. Thus, a particular group of glasses within the compositional limits set out hereinafter can be heat treated in a controlled manner to yield a substantially transparent, highly crystalline, glass-ceramic body. These glass-ceramics can also be strengthened by ion exchange in accordance with the teachings of the above-cited U.S. Pat. No. 3,573,072.

We have discovered that glass-ceramic bodies possessing coefficients of thermal expansion (25°–300° C.) ranging from about 90–150 × $10^{-7}$/° C., demonstrating dimensional stability up to 1,200° C., exhibiting a modulus of rupture when glazed in excess of 50,000 psi, and which can be strengthened through ion exchange to yield modulus of rupture values in excess of 100,000 psi. can be produced by heat treating glass compositions consisting essentially, by weight on the oxide basis, of about 35–50 percent $SiO_2$, 30–45 percent $Al_2O_3$, 15–26 percent $R_2O$, where $R_2O$ consists of 0–22 percent $Na_2O$ and 0–26 percent $K_2O$, the mole ratio of $Al_2O_3$ to $R_2O$ being greater than 1, and at least one nucleating agent selected from the group consisting of about 5–15 percent $TiO_2$, 1–5 percent $ZrO_2$, and 2–8 percent $SnO_2$. We have discovered further that when $K_2O$ is present in an amount of at least 3 percent by weight, a substantially transparent glass-ceramic article can be produced by utilizing a narrowly defined portion of the effective heat treating schedule set out hereinafter.

We have learned that the amounts of $SiO_2$, $Al_2O_3$, $R_2O$, and nucleating agent specified above must be adhered to strictly in order to secure a body containing homogeneous very fine-grained crystallization and demonstrating high temperature dimensional stability. Hence, the uniformity of the crystallization and the extreme fine-grainness thereof (preferably all less than 1 micron in diameter) provides an article which is easier to glaze and to strengthen through the above-described ion exchange reaction. Furthermore, the strengthening so resulting will exhibit better uniformity across the article.

The $Al_2O_3$ content of the base glass composition is especially critical in imparting high refractoriness, i.e., thermal stability, to the products of the invention. Thus, crystallized articles containing at least 30 percent weight $Al_2O_3$ and having a mole ratio of $Al_2O_3/R_2O$ greater than 1 can be exposed to a soaking heat treatment at temperatures up to 1,200° C. for periods of several hours with essentially no visible deformation or distortion. However, this high temperature dimensional stability rapidly deteriorates when the $Al_2O_3$ content is reduced below 30 percent.

U.S. Pat. No. 3,528,828 describes glass-ceramic articles in the $R_2O$-$Al_2O_3$-$SiO_2$-$TiO_2$ composition field but wherein the $Al_2O_3$ content is less than 30 percent by weight and the mole ratio of $Al_2O_3/R_2O$ is less than 1. That patent discloses articles consisting essentially, by weight, of 44–52 percent $SiO_2$, 22–29 percent $Al_2O_3$, 15–22 percent $Na_2O$, 0–3 percent $K_2O$, and 6–12 percent $TiO_2$, wherein the mole ratio of $Na_2O$ + $K_2O$ to $Al_2O_3$ of at least 1.02 is demanded. Such articles contain coarser-grained crystals (up to 30 microns in diameter) and do not exhibit the highly desirable high temperature dimensional stability demonstrated by the products of our invention.

Nepheline ($Na_2O \cdot Al_2O_3 \cdot 2SiO_2$) and kalsilite ($K_2O \cdot Al_2O_3 \cdot 2SiO_2$) are not isostructural but both structures are based upon a tridymite-type framework in which approximately half of the silicon atoms are replaced by aluminum, the electrical neutrality being maintained by the presence of alkali atoms in the structural cavities. In addition to structural differences for different compositions, solid solution is present over the greater part of the chemical range of the series. Kaliophilite, which has a similar compositional range to kalsilite, is believed to be a metastable phase at atmospheric pressures and its relationships to kalsilite and to other potassium-rich phases are not completely understood. The literature speaks of "nepheline" to encompass a rather broad range of solid solutions having crystal structures in the hexagonal system and generally corresponding to that of the basic mineral whose formula is frequently written $Na_3K[Al_4Si_4O_{16}]$. Hence, although the crystals may vary considerably in chemical composition, they have essentially the same crystal structure which is evidenced by a similar pattern when examined by X-ray diffraction. Thus, while the classic nepheline crystal will exhibit a characteristic pattern of diffraction peaks, the d-spacing and intensity of these peaks will vary somewhat depending upon the nature and amount of solid solution and substitution of other ions therein.

In producing the fine-grained glass-ceramic articles of this invention, the glass-forming ingredients and nucleating agent are carefully mixed together, this batch is then melted for a sufficient length of time at the proper temperature to insure a homogeneous melt, and the melt is simultaneously cooled to a temperature at least below the transformation range and a shape of a desired configuration formed therefrom. The resulting glass shape is subsequently subjected to the hereinafter-described heat treatment to cause crystallization to occur in situ. As employed herein, the transformation range is that temperature at which a liquid melt is deemed to have become an amorphous solid, this temperature being in the vicinity of the annealing point of the glass. The annealing points of the glasses of this invention generally range from about 650° to 750° C.

Our invention normally contemplates a two-step heat treating sequence to yield the desired product, i.e., the glass article must first be heated to a particular temperature range to cause nucleation and then the temperature is raised to promote the development of the desired dense crystallization of nepheline and/or kaliophilite-type crystals. We have discovered that nucleation is initiated within the temperature range of about 700°–875° C. whereas crystallization is expedited within the range of about 875°–1,200° C. In the preferred embodiment of the invention, the glass article shaped from the melt, after being cooled to room temperature to permit visual inspection, is heated to a temperature between about 700°– 875° C. and maintained thereat for about ½–8 hours to initiate nucleation of the crystalline phase and begin the growth of sufficient crystallization to provide a supporting structure to preclude deformation of the body as the temperature is raised above the softening point of the glass, after which the temperature is raised to about 875°–1,200° C. and maintained thereat for about ½–8 hours to achieve the desired dense crystallization. The crystalized body is then cooled to room temperature. In general, less time is required for satisfactory nucleation and crystallization when the higher temperatures of the two respective ranges are utilized.

It will be appreciated that minor modifications in procedure from our preferred practice are possible. Hence, if visual inspection and/or decoration of the glass article is not desired, the article need only be cooled to just below the transformation range and then reheated to the nucleation temperature to commence the heat treating process. The rate at which the glass body can be heated from room temperature to the nucleation range depends upon the coefficient of thermal expansion of the glass and the physical dimensions of the body. A heating rate of about 5° C./minute has been found to be satisfactory in substantially all instances although faster or slower rates can be determined through routine experimentation. Where the article is very thin-walled, it may be plunged directly into a furnace maintained at the nucleating temperature.

A satisfactory crystallized body can be attained where the glass article is heated at a substantially constant rate from room temperature or the transformation range to the crystallization temperature and then held there at for a period of time sufficient to develop the desired crystallization. Thus, there is no holding period as such within the nucleation range, it being appreciated, of course, that the temperature increase is not so rapid that there is not sufficient time for proper nucleation. In like manner, no specific dwell time is necessary in the crystallization range so long as the article is subjected to temperatures within the crystallization range for a sufficient time. Dwell times as long as 24 hours and longer in the nucleation and crystallization zones may be utilized but no significant improvement in final crystallization results therefrom, so such longer times are generally deemed uneconomical. A satisfactory crystallized body can be attained by merely holding the glass body at 875° C. for a sufficient length of time to cause nucleation and crystal growth to occur. However, it is preferred to raise the temperature in order to expedite the crystal growth.

The rate of heating above the transformation range which a glass body can tolerate without excessive deformation and slumping is dependent primarily upon the speed at which crystallization proceeds therein. Commonly, as a glass body is heated above the transformation range, softening of the body occurs and deformation takes place. However, as was pointed out above, when the glass articles of our invention are heated into the nucleation range, incipient crystallization occurs which tends to reduce the viscous flow of the body and thereby inhibits deformation of the body.

Hence, in the two-step heating schedule, the glass article is first heated to a temperature slightly higher than the transformation range to initiate crystallization after which the article is raised to a much higher temperature to complete the crystallization. The crystallization of the glass during heat treatment takes place more rapidly as the temperature is raised close to the liquidus of the principal crystalline phase. The softening point and, hence, the deformation point of the glass-ceramic body is generally considerably higher than the base glass. Therefore, the rate at which the glass body is heated must be balanced against the rate of crystallization within the body, the proportion of glassy matrix being very large in the early stages of crystallization giving rise to deformation of the body if the temperature is raised too rapidly.

We have learned that heating rates in excess of 5° C./minute can be successfully employed with small articles, particularly articles having thin walls. However, we prefer to limit the heating rate to not more than about 5° C./minute where crystallization is induced without a two-step cycle. In most instances, this rate of heating will not cause excessive deformation of the glass article as it is being heated above its softening point and before crystallization has progressed to any great extent. It is apparent, of course, that raising the temperature more slowly will also produce densely crystallized bodies. Finally, we have utilized physical supporting means such as setters for the glass bodies to aid in inhibiting deformation during heat treatment. Nevertheless, in all cases, the rate of heating should be adjusted so as to closely correspond with the speed of internal crystallization.

To summarize, then, our invention contemplates two principal heat treating practices. In the first, the glass body is subjected to a two-step schedule whereas in the second, the glass body is heated, without any substantial dwell period at a particular temperature, to the final crystallization range. In the second embodiment, the glass body is normally heated at a reasonably uniform rate, uniformity not being demanded but making for convenience in automatic production. The rate of heating is normally not greater than about 5° C. per minute. It will be appreciated, however, that various modifications in these two basic practices are possible. For example, a multiple step heat treating schedule is possible where several dwell periods are utilized between the nucleation and final crystallization ranges. Such a schedule may be useful where the rate of crystallization of the glass is slow.

The speed at which the completed semicrystalline ceramic can be cooled to room temperature depends upon its resistance to thermal shock and the physical dimensions of the article. Where the shapes are small, they may be removed directly from the heat treating chamber and allowed to cool in the surrounding air. A cooling rate of about 5° C./minute has permitted the production of sound bodies in all instances and, frequently, the heat to the furnace utilized as the heat treating chamber is merely cut off and the furnace allowed to cool at its own rate with the article retained therein.

The compositional limits of the glass-forming components and the nucleating agent must be carefully observed in order to obtain the desired dense, very fine-grained glass-ceramic body containing a nepheline and/or kaliophiliteotype crystal as the principal crystalline phase. Thus, at least about 15 percent by weight of $R_2O$ must be present to result in the crystallization of nepheline and/or kaliophilite-type crystals but more than about 26 percent yield glasses which may be unstable and/or deform excessively during heat treatment. Also, the crystallization developed therein is frequently coarse-grained. At least about 30 percent by weight of $Al_2O_3$ is necessary to produce fine-grained crystals and high temperature dimensional stability while more than about 45 percent results in a glass batch that is difficult to melt satisfactorily at conventional glass-melting temperatures and may also lead to spontaneous devitrification as the melt is being cooled to a glass. The amount of nucleating agent added to the batch must be sufficient to provide proper nucleation but not in such quantity as to cause spontaneous crystallization as the melt is being cooled to a glass. Also, excessive amounts of nucleating agent result in the growth of coarse rather than fine-grained crystals. Silica forms the third component of the glass batch and is present as a network former and in the proper amount to approximate the stoichiometry of nepheline and/or kaliophilite.

As was pointed out above, transparent glass-ceramic articles can be produced from glasses having compositions within the recited ranges but there being at least about 3 percent by weight of $K_2O$ present therein which are heat treated in a certain manner. The mechanics of this heat treatment are the same as those described above except that the final crystallization temperature does not exceed about 975° C. for $TiO_2$-nucleated bodies, about 1,125° C. for $ZrO_2$ and about 1,100° C. for $SnO_2$-nucleated bodies. The crystal phases developed therein are similar in structure to those present in the opaque glass-ceramics but the size of the crystal is much smaller. These transparent bodies will become opaque if heated above the recited crystallization temperatures due probably to crystal growth or recrystallization.

Minor amounts of compatible metal oxides such as CaO, ZnO, and $B_2O_3$ may be included in the batch as may also the alkali metal oxides $Rb_2O$ and $Cs_2O$. $B_2O_3$ is a fluxing agent but should not be present in more than about 5 percent by weight. The other recited metal oxides can form solid solutions with the nepheline-type crystals or may merely act as diluents. PbO in an amount less than about 5 percent by weight may be added to improve transparency without disturbing the crystal structure. The total of all such additions should not exceed about 15 percent by weight in the opaque glass-ceramic and not more than about 5 percent by weight in addition to PbO to insure transparency.

Table I records specific examples wherein glass-forming batches were compounded from materials, either oxides or other compounds which, on being melted together, are converted to the desired oxide composition in the required proportion. The compositions recited therein are calculated from their respective batches to the oxide basis in weight percent, exclusive of minor impurities which may be present in the batch materials, the nucleating agents being added in excess of the glass-forming ingredients. Although these batches yield fairly fluid melts, a conventional fining agent such as $As_2O_3$ in amounts up to about 2 percent by weight can be added thereto. Since the amount of fining agent remaining after the glass is formed is insignificant, no listing of this component was made in the Table.

Each of the batches was melted at about 1,650° C. for about 16 hours in crucibles, pots, or tanks, depending upon the quantity of product desired. The melts were stirred for ½ hour and then allowed to fine for ½ hour after stirring. For test purposes, pieces of ¼ inch diameter cane were drawn and 4 inches diameter patties were poured into open molds. These patties were placed in an annealer at 650° C. To aid in achieving a homogeneous melt, the batch ingredients were dry ball-milled before melting. Thereafter, the patties and pieces of cane were placed in a furnace and the temperature raised therein at about 5° C./minute to the nucleation range, as recorded in Table II, and held thereat for the times specified to initiate nucleation and begin crystal growth. Subsequently, the furnace was heated at the rate set out in Table II to the crystallization range, maintained thereat for the times set forth, and then the heat to the furnace was cut off and the furnace permitted to cool to room temperature with the articles contained therein, this rate being approximately 3° C./minute.

Table II also sets out the moduli of rupture (psi), densities (g/cc.), and coefficients of thermal expansion ($\times 10^{-7}$ per °C.) of the glass-ceramic bodies as well as a description of the appearance of the body and the identification of the crystallization present as determined by a cursory X-ray diffraction analysis. Nepheline and/or synthetic kaliophilite were the principal crystalline phases observed in the majority of the examples while in some instances minor amounts of such crystals as anatase ($TiO_2$), cubic zirconia ($ZrO_2$), and gahnite ($ZnO \cdot Al_2O_3$), were noted. Very minor amounts of crystalline phases are not reported in the Table. Since nepheline and/or synthetic kaliophilite were the greatly predominant phases, the texture of the glass-ceramic was dependent upon the crystal size of these phases which were formed. Although physical properties were not obtained nor X-ray diffraction studies made in every composition melted and heat treated, each example represents a batch which was actually melted and converted to a glass-ceramic. The modulus of rupture determinations were measured by the conventional method using rods which had been abraded with 30-grit silicon carbide. The procedures for obtaining the density and coefficient of linear thermal expansion are also well-known and the values recorded in Table II represent the average coefficient of thermal expansion between 25°–300° C.

TABLE I

| | Percent | | | | | | | |
|---|---|---|---|---|---|---|---|---|
| | 1 | 2 | 3 | 4 | 5 | 6 | 7 | 8 |
| $SiO_2$ | 44.3 | 43.8 | 42.2 | 41.8 | 41.1 | 40.1 | 40.1 | 39.6 |
| $Al_2O_3$ | 31.5 | 31.5 | 31.5 | 31.5 | 31.5 | 31.5 | 31.5 | 31.2 |
| $Na_2O$ | 16.8 | 15.7 | 12.6 | 11.7 | 10.5 | 8.3 | 7.0 | 4.5 |
| $K_2O$ | | 1.6 | 6.3 | 7.6 | 9.5 | 12.7 | 14.0 | 17.3 |
| $TiO_2$ | 7.4 | 7.4 | 7.4 | 7.4 | 7.4 | 7.4 | 7.4 | 7.4 |

| | Percent | | | | | | | |
|---|---|---|---|---|---|---|---|---|
| | 9 | 10 | 11 | 12 | 13 | 14 | 15 | 16 |
| $SiO_2$ | 39.5 | 38.7 | 44.4 | 42.6 | 44.9 | 37.6 | 40.6 | 42.1 |
| $Al_2O_3$ | 30.2 | 30.4 | 31.5 | 31.5 | 31.5 | 37.0 | 30.8 | 32.0 |
| $Na_2O$ | 0.7 | | 15.7 | 10.5 | 11.6 | 11.5 | 11.0 | 11.4 |
| $K_2O$ | 22.3 | 23.5 | | 6.2 | | | 8.3 | 8.6 |
| $TiO_2$ | 7.3 | 7.4 | 7.4 | 7.4 | 7.4 | 7.4 | 9.0 | 5.6 |
| CaO | | | 1.0 | 1.8 | 4.6 | 6.5 | 0.3 | 0.3 |

TABLE I—Continued

| | Percent | | | | | | | | | Percent | | | | | |
|---|---|---|---|---|---|---|---|---|---|---|---|---|---|---|---|
| | 17 | 18 | 19 | 20 | 21 | 22 | 23 | 24 | | 25 | 26 | 27 | 28 | 29 | 30 |
| SiO$_2$ | 43.0 | 43.0 | 43.2 | 38.1 | 39.7 | 37.9 | 38.2 | 39.1 | SiO$_2$ | 37.6 | 38.2 | 48.1 | 47.2 | 49.4 | 44.1 |
| Al$_2$O$_3$ | 32.3 | 32.3 | 35.4 | 40.4 | 38.7 | 37.4 | 37.7 | 38.2 | Al$_2$O$_3$ | 31.5 | 36.5 | 29.3 | 28.9 | 27.3 | 28.9 |
| Na$_2$O | 12.1 | 12.1 | 11.9 | 14.4 | 10.4 | 13.3 | 10.3 | 10.0 | Na$_2$O | 12.6 | 11.3 | 11.4 | 8.0 | 11.7 | 8.4 |
| K$_2$O | 7.8 | 7.8 | 7.5 | 5.1 | 9.2 | | 7.1 | 9.8 | K$_2$O | 6.3 | 7.3 | 3.8 | 8.5 | 4.2 | 16.6 |
| TiO$_2$ | 2.9 | 2.9 | | | | | | | ZnO | 4.6 | | | | | |
| ZrO$_2$ | 1.9 | | 2.0 | 2.0 | 2.0 | 2.0 | 2.0 | | TiO$_2$ | 7.4 | | 7.4 | 7.4 | 7.4 | |
| SnO$_2$ | | 1.9 | | | | | | 2.9 | PbO | | 4.7 | | | | |
| Rb$_2$O | | | | | | 9.4 | 4.7 | | ZrO$_2$ | | 2.0 | | | | 2.0 |

TABLE II

| Example No. | Heat treatment schedule | Glass-ceramic description | Crystal phases | Modulus of rupture | Coefficient of expansion | Density |
|---|---|---|---|---|---|---|
| 1 | 860° C.—4 hours<br>5° C./min. to 1,100° C.<br>1,100° C.—4 hours | Dense, white, fine-grained, opaque | Nepheline, anatase | 9,800 | 114.6 | 2.655 |
| 2 | 850° C.—4 hours<br>5° C./min. to 1,100° C.<br>1,100° C.—4 hours | ....do | ....do | 9,000 | 116 | |
| 3 | 850° C.—4 hours<br>5° C./min. to 1,100° C.<br>1,100° C.—4 hours | ....do | ....do | 8,500 | 121.7 | 2.662 |
| | 850° C.—4 hours<br>5° C./min. to 950° C.<br>950° C.—4 hours | Transparent, very fine-grained | ....do | 7,900 | 123.3 | 2.668 |
| 4 | 850° C.—4 hours<br>5° C./min. to 1,100° C.<br>1,100° C.—4 hours | Dense, white, fine-grained, opaque | ....do | 8,000 | 121 | 2.661 |
| | 850° C.—4 hours<br>5° C./min. to 950° C.<br>950° C.—4 hours | Transparent, very fine-grained | ....do | | 123 | |
| 5 | 850° C.—4 hours<br>5° C./min. to 1,100° C.<br>1,100° C.—4 hours | Dense, white, very fine-grained, opaque | ....do | | 129.1 | 2.667 |
| | 850° C.—4 hours<br>5° C./min. to 950° C.<br>950° C.—4 hours | Transparent, very slight haze, fine-grained | ....do | | | |
| 6 | 850° C.—4 hours<br>5° C./min. to 1,050° C.<br>1,050° C.—6 hours | Dense, white, very fine-grained, opaque | | 8,000 | 130 | |
| | 800° C.—2 hours<br>5° C./min. to 950° C.<br>950° C.—4 hours | Transparent, very fine-grained | Nepheline, kaliophilite | | | 2.658 |
| 7 | 700° C.—no hold<br>50° C./hr. to 1,000° C.<br>1,000° C.—4 hours | Dense, white, very fine-grained | Kaliophilite, nepheline | 7,700 | 132.2 | 2.652 |
| 8 | 850° C.—4 hours<br>5° C./min. to 1,100° C.<br>1,100° C.—4 hours | Dense, white, fine-grained, opaque | ....do | 8,500 | | 2.598 |
| | 750° C.—4 hours<br>5° C./min. to 900° C.<br>900° C.—6 hours | Transparent, very fine-grained | | | 135 | |
| 9 | 700° C.—no hold<br>50° C./hr. to 1,000° C.<br>1,000° C.—4 hours | Dense, white, fine-grained, opaque | Kaliophilite | | 141.3 | 2.592 |
| 10 | 850° C.—4 hours<br>5° C./min. to 1,100° C.<br>1,100° C.—4 hours | ....do | ....do | 8,000 | | |
| | 750° C.—4 hours<br>5° C./min. to 950° C.<br>950° C.—2 hours | Transparent, very fine-grained | ....do | | 143 | 2.590 |
| 11 | 850° C.—4 hours<br>5° C./min. to 1,100° C.<br>1,100° C.—4 hours | Dense, white, fine-grained, opaque | Nepheline | 9,000 | | |
| 12 | 850° C.—4 hours<br>5° C./min. to 1,100° C.<br>1,100° C.—4 hours | Dense, white, very fine-grained, opaque | Nepheline, anatase | | 109.1 | 2.647 |
| | 850° C.—hours<br>5° C./min. to 950° C.<br>950° C.—4 hours | Transparent, very fine-grained | ....do | | | |
| 13 | 850° C.—4 hours<br>5° C./min. to 1,100° C.<br>1,100° C.—4 hours | Dense, white, fine-grained, opaque | ....do | | | |
| 14 | 850° C.—4 hours<br>5° C./min. to 950° C.<br>950° C.—4 hours | Dense, off-white, fine-grained opaque | Nepheline | | | 2.700 |
| | 850° C.—4 hours<br>5° C./min. to 1,100° C.<br>1,100° C.—4 hours | Dense, gray, opaque | | 13,350 | | 2.726 |
| 15 | 850° C.—4 hours<br>5° C./min. to 1,100° C.<br>1,100° C.—4 hours | Dense, white, fine-grained, opaque | | 6,000 | 124.7 | 2.684 |
| 16 | 850° C.—4 hours<br>5° C./min. to 950° C.<br>950° C.—4 hours | Transparent, very fine-grained | Nepheline | 6,000 | 126.9 | 2.676 |
| | 850° C.—4 hours<br>5° C./min. to 1,100° C.<br>1,100° C.—4 hours | Dense, white, fine-grained, opaque | ....do | | | |
| 17 | 850° C.—2 hours<br>5° C./min. to 1,200° C.<br>1,200° C.—4 hours | ....do | Nepheline, cubic ZrO$_2$ | | | |
| | 850° C.—2 hours<br>5° C./min. to 950° C.<br>950° C.—4 hours | Transparent, very fine-grained | ....do | | | |
| 18 | 850° C.—4 hours<br>200° C./hr. to 1,100° C.<br>1,100° C.—4 hours | Dense, white, fine-grained, opaque | Nepheline | 9,000 | | |
| 19 | 850° C.—4 hours<br>200° C./hr. to 1,100° C.<br>1,100° C.—4 hours | Transparent, very fine-grained | Nepheline, cubic ZrO$_2$ | | 119.9 | 2.645 |
| | 700° C.—4 hours<br>50° C./hr. to 1,000° C.<br>1,000° C.—4 hours | ....do | | 7,600 | 121.4 | 2.651 |

TABLE II—Continued

| Example No. | Heat treatment schedule | Glass-ceramic description | Crystal phases | Modulus of rupture | Coefficient of expansion | Density |
|---|---|---|---|---|---|---|
| | | | Nepheline, cubic $ZrO_2$ | | | |
| | | 5 | ...do... | | | |
| | | | ...do... | | | |
| 22 | 850° C.—4 hours<br>200° C./hr. to 1,100° C.<br>1,100° C.—4 hours | Dense, white, very fine-grained, opaque | | | | |
| 23 | 850° C.—4 hours<br>200° C./hr. to 1,100° C.<br>1,100° C.—4 hours | Transparent, very fine-grained | | | | |
| | 850° C.—4 hours<br>5° C./min. to 1,200° C.<br>1,200° C.—2 hours | Dense, white, fine-grained, opaque | Nepheline | | | |
| 24 | 850° C.—4 hours<br>200° C./hr. to 1,100° C.<br>1,100° C.—4 hours | Translucent, very fine-grained | ...do... | | | |
| | 700° C.—no hold<br>50° C./hr. to 1,000° C.<br>1,000° C.—4 hours | Transparent, very fine-grained | ...do... | | | |
| 25 | 850° C.—4 hours<br>5° C./min. to 1,100° C.<br>1,100° C.—4 hours | Dense, white, fine-grained, opaque | Nepheline, gahnite | 9,500 | 129.6 | 2.804 |
| 26 | 850° C.—4 hours<br>200° C./hr. to 1,100° C.<br>1,100° C.—4 hours | Transparent, very fine-grained | Nepheline | | | |
| 27 | 850° C.—4 hours<br>200° C./hr. to 1,000° C.<br>1,000° C.—4 hours | Deformed, low crystallinity | Nepheline | | | |
| 28 | 850° C.—4 hours<br>200° C./hr. to 1,000° C.<br>1,000° C.—4 hours | ...do... | Kaliophilite | | | |
| 29 | 850° C.—4 hours<br>200° C./hr. to 1,000° C.<br>1,000° C.—4 hours | ...do... | Nepheline, cubic $ZrO_2$ | | | |
| 30 | 850° C.—4 hours<br>200° C./hr. to 1,000° C.<br>1,000° C.—4 hours | ...do... | Kaliophilite | | | |

Tables I and II clearly illustrate the very limited range of glass compositions which can be converted by controlled heat treatment into glass-ceramic articles wherein the principal crystalline phase is a nepheline-type and/or kaliophilite-type crystal. When glazed, Examples 1–26 may exhibit an average modulus of rupture greater than 50,000 psi and can be plunged into boiling water from normal room temperature without harm thereto. Such articles are also capable of withstanding a sudden temperature decrease from about 150° to 0° C. The crystal content of those articles has been measured to be in excess of 50 weight percent and is frequently greater than 80 weight percent, this factor being dependent upon the extent to which the components of the batch are adaptable to the formation of crystal phases. The crystals, themselves, are substantially all finer than 5 microns in diameter with the great majority being less than 1 micron in diameter, and are randomly, but uniformly, dispersed throughout the residual glassy matrix.

Tables I and II clearly illustrate the critical effect which the $Al_2O_3$ content has upon the high temperature dimensional stability of the resulting products. Thus, Examples 27–30, containing less than 30 percent by weight $Al_2O_3$ and wherein the mole ratio of $Al_2O_3$ to $R_2O$ is less than 1, were poorly crystallized and exhibited substantial deformation and distortion even when a crystallization temperature of only 1,000° C. was employed.

Tables I and II also illustrate the composition and heat treatment parameters which must be observed to obtain a transparent product. Thus, not only must the glass contain at least about 3 percent by weight of $K_2O$ and the amount of added compatible metal oxides be kept below about 5 percent in addition to PbO, but the maximum heat treating temperatures are also critical.

Finally, articles made from Examples 1–26 can be strengthened through the method of Duke and Karstetter, referred to above, to exhibit a modulus of rupture greater than 100,000 psi.

Although in each of the examples cited above, the melt was shaped by pouring patties into open molds and drawing cane, it will be appreciated that any of the conventional glass forming procedures such as blowing, pressing, rolling, spinning, etc. are also applicable to the invention.

We claim:

1. A glass-ceramic body dimensionally stable up to 1,200° C. having a coefficient of thermal expansion between 90–150 × $10^{-7}$/° C. and consisting essentially of nepheline-type and/or kaliophilite-type crystals randomly, but uniformly, dispersed in a glassy matrix, said crystals being predominantly less than 1 micron in diameter, comprising at least 50 percent by weight of the body, and being formed through crystallization in situ from a glass body consisting essentially, by weight on the oxide basis, of 35–50 percent $SiO_2$, 30–45 percent $Al_2O_3$, 15–26 percent $R_2O$, wherein $R_2O$ consists of 0–22 percent $Na_2O$ and 0–26 percent $K_2O$ and wherein the mole ratio of $Al_2O_3$ to $R_2O$ is greater than 1, and at least one nucleating agent selected from the group consisting of about 5–15 percent $TiO_2$, 1–5 percent $ZrO_2$, and 2–8 percent $SnO_2$, said glossy matrix consisting essentially of the uncrystallized portion of the glass after the crystallization of the crystals.

2. A transparent glass-ceramic body having a coefficient of thermal expansion between 90–150 × $10^{-7}$/° C. and consisting essentially of nepheline-type and/or kaliophilite-type crystals randomly, but uniformly, dispersed in a glassy matrix, said crystals being predominantly less than 1 micron in diameter, comprising at least 50 percent by weight of the body, and being formed through crystallization in situ from a glass body consisting essentially, by weight on the oxide basis, of 35–50 percent $SiO_2$, 30–45 percent $Al_2O_3$, 15–26 percent $R_2O$, wherein $R_2O$ consists of 0–22 percent $Na_2O$ and 0–26 percent $K_2O$ and wherein the mole ratio of $Al_2O_3$ to $R_2O$ is greater than 1, and at least one nucleating agent selected from the group consisting of about 5–15 percent $TiO_2$, 1–5 percent $ZrO_2$, and 2–8 percent $SnO_2$, said glassy matrix consisting essentially of the uncrystallized portion of the glass after the crystallization of the crystals.

* * * * *